United States Patent
Zalevsky et al.

(10) Patent No.: US 12,061,978 B2
(45) Date of Patent: Aug. 13, 2024

(54) OPTICAL NEURAL NETWORK UNIT AND OPTICAL NEURAL NETWORK CONFIGURATION

(71) Applicant: BAR ILAN UNIVERSITY, Ramat Gan (IL)

(72) Inventors: Zeev Zalevsky, Rosh HaAyin (IL); Eyal Cohen, Gedera (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 912 days.

(21) Appl. No.: 17/041,333

(22) PCT Filed: Mar. 26, 2019

(86) PCT No.: PCT/IL2019/050345
§ 371 (c)(1),
(2) Date: Sep. 24, 2020

(87) PCT Pub. No.: WO2019/186548
PCT Pub. Date: Oct. 3, 2019

(65) Prior Publication Data
US 2021/0027154 A1 Jan. 28, 2021

Related U.S. Application Data

(60) Provisional application No. 62/648,538, filed on Mar. 27, 2018.

(51) Int. Cl.
*G06N 3/067* (2006.01)
*G02F 1/35* (2006.01)
(Continued)

(52) U.S. Cl.
CPC ............. *G06N 3/067* (2013.01); *G02F 1/353* (2013.01); *G06F 18/214* (2023.01);
(Continued)

(58) Field of Classification Search
CPC ........ G06N 3/067; G06N 3/0675; G06N 3/08; G06V 30/18057; G06V 30/18105; G06V 10/82; G06V 30/10
See application file for complete search history.

(56) References Cited

U.S. PATENT DOCUMENTS

| 5,129,041 A | 7/1992 | Pernick et al. |
| 6,529,614 B1 | 3/2003 | Chao et al. |

(Continued)

FOREIGN PATENT DOCUMENTS

| CN | 104412526 A | 3/2015 |
| CN | 105046325 A | 11/2015 |

(Continued)

OTHER PUBLICATIONS

International Search Report from International Application No. PCT/IL2019/050345 mailed Jun. 30, 2019.
Cohen, "Neural Networks Within Multi-Core Optic Fibers", Scientific Reports, Jul. 7, 2016, pp. 1-14.
Saeidi, "Optical Neural Network", Mar. 31, 2009, pp. 1-35.

*Primary Examiner* — Christopher Stanford
*Assistant Examiner* — Journey F Sumlar
(74) *Attorney, Agent, or Firm* — Dorsey & Whitney LLP

(57) ABSTRACT

An artificial neuron unit and neural network for processing of input light are described. The artificial neuron unit comprises a modal mixing unit, such as multimode optical fiber, configured for receiving input light and applying selected mixing to light components of two or more modes within the input light and for providing exit light, and a filtering unit configured for applying preselected filter onto said exit light for selecting one or more modes of the exit light thereby providing output light of the artificial neuron unit.

27 Claims, 8 Drawing Sheets

(51) Int. Cl.
*G06F 18/21* (2023.01)
*G06F 18/214* (2023.01)
*G06N 3/08* (2023.01)
*G06V 10/82* (2022.01)
*G06V 30/18* (2022.01)
*G06V 30/199* (2022.01)
*G06V 30/10* (2022.01)

(52) U.S. Cl.
CPC .............. *G06F 18/217* (2023.01); *G06N 3/08* (2013.01); *G06V 10/82* (2022.01); *G06V 30/18057* (2022.01); *G06V 30/18105* (2022.01); *G06V 30/199* (2022.01); *G06V 30/10* (2022.01)

(56) References Cited

U.S. PATENT DOCUMENTS

| | | |
|---|---|---|
| 6,819,469 B1 | 11/2004 | Koba |
| 2017/0351293 A1 | 12/2017 | Carolan et al. |

FOREIGN PATENT DOCUMENTS

| | | |
|---|---|---|
| CN | 107430704 A | 12/2017 |
| JP | H03167614 A | 7/1991 |
| JP | 2012531812 A | 12/2012 |
| WO | 2010151432 A1 | 12/2010 |
| WO | 2015136572 A1 | 9/2015 |
| WO | 2017033197 A1 | 3/2017 |
| WO | 2017210550 A1 | 12/2017 |

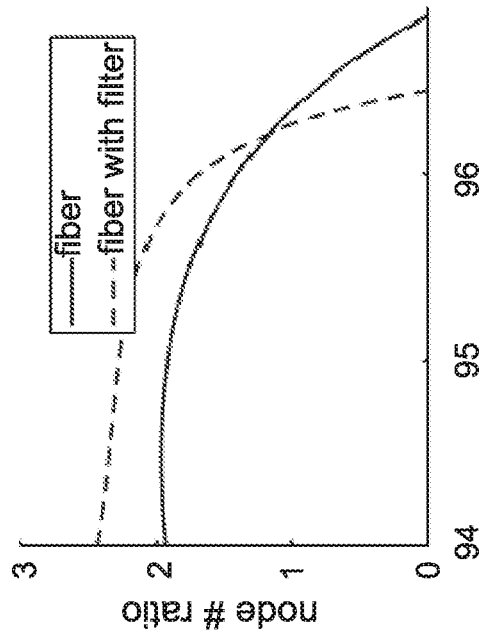
FIG. 8A
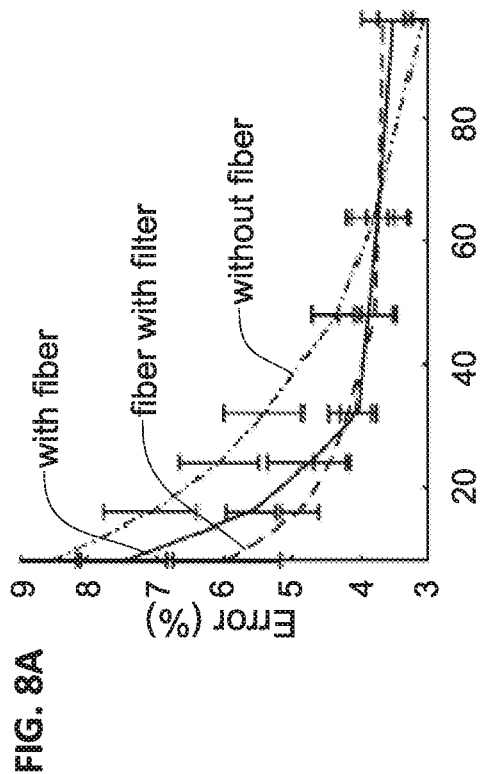
FIG. 8C
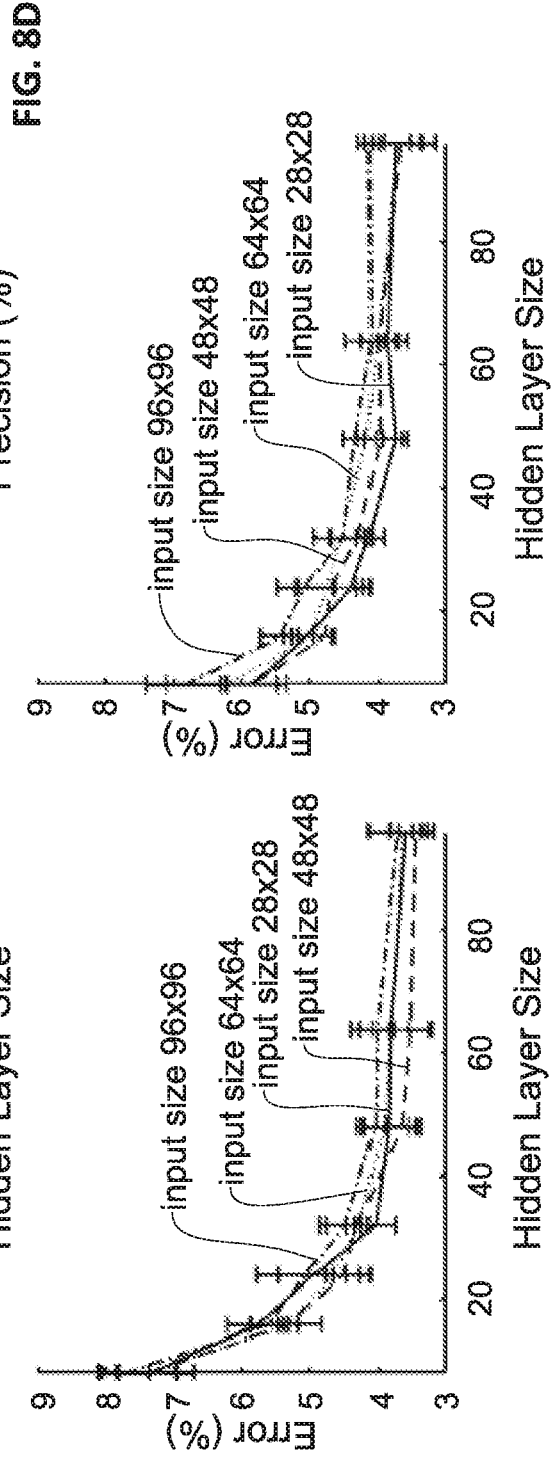
FIG. 8B
FIG. 8D

OPTICAL NEURAL NETWORK UNIT AND OPTICAL NEURAL NETWORK CONFIGURATION

TECHNOLOGICAL FIELD

The present invention relates to optical computation devices, and more specifically, optical computation devices based on optically integrated artificial neuron networks.

BACKGROUND

Optical computing utilizes manipulation on visible or infrared light, rather than electric current, to perform computation processes. Generally optical computing enables faster computation rates, this is partly since manipulations on light pulses occur at speed of light in a corresponding medium. This enables a higher bandwidth with respect to computing using electric currents as used in conventional methods of computing. For example, electric current signal propagates at only about 10 percent of the speed of light, exemplifying almost 10 fold improvement in computing rate for optical computing.

Conventional optical processing systems typically utilizes electronic-optical hybrid processing, generally referred to as optoelectronic processing. In these systems optical signals are used for data transmission and for certain processing operations, and being converted to electronic signals for certain other processing operations. Such optoelectronic devices may lose about 30% of their energy converting electronic energy into photons and back. Moreover the conversion of optical to electronic signals and back slows the transmission and processing of data. High research efforts are directed at all-optical computing, which eliminates the need for optical-electrical-optical (OEO) conversions, thus lessening the need for electrical power and increasing processing rate.

Another advantageous aspect in the field of optical computing is the implementation of artificial neural networks (ANNs). Generally neural network systems provide processing that enables solving problems in a way corresponding to operation of a human brain. Artificial neural networks are basically computer systems inspired by the biological neural networks (BNNs) that constitute the brain. These systems "learn" to improve their performance to execute a set of commands in order to complete a task of interest. More specifically, ANNs evolve their set of relevant characteristics from learning material provided thereto for optimizing processing of relevant input for a selected task. A typical ANN system is based on a set of connected units or nodes called artificial neurons which are an artificial equivalent of the biological neurons that constitute the BNN in a brain. The connections between the nodes, being artificial equivalents of the biological synapses, can transmit a signal from one nodes to another. The artificial neuron that receives the signal is configured to process it and then transmit a corresponding signal to artificial neuron/s connected thereto. Typically, artificial neurons are arranged in layers. Different layers may perform different kinds of transformations on their inputs and transmit a corresponding output signal. Signals travel from the first (input), to the last (output) layer, possibly after traversing the different layers several times.

Optical artificial neuron units have been described and are being developed. For example, WO 2017/033197 to Zalevsky et al. teaches an integrated optical module. The optical module comprises multi optically coupled channels, and enables the use thereof in an Artificial Neural Network (ANN). According to some embodiments the integrated optical module comprises a multi-core optical fiber, wherein the cores are optically coupled.

GENERAL DESCRIPTION

There is a need in the art for an all-optical neural network configuration enabling high speed and low power processing of selected input data in accordance with suitable training. The present invention provides optical neuron unit enabling all optical processing of input light signal for providing an exit optical signal. The optical neuron unit of the invention generally comprises at least one multi-mode optical fiber and corresponding spatial light modulator unit configured together for varying optical signals transmitted therethrough based on selected spatial pattern determined by training process of neural network to which the optical neuron is associated.

The multimode optical fiber (MMF) has a first end and a second end and a selected length and diameter, and is used for propagating input signals therethrough while mixing spatial modes of the propagating signals. More specifically, light field being input to the MMF may be combination of one or more spatial modes with respect to the MMF structure. Each of the spatial modes propagated through the MMF with respective group velocity, varying modal combination of the output light. Additionally propagation through the MMF may cause certain mixing between light components shifting optical energy between the modes in accordance with shape and optical properties of the MMF. Thus, the MMF provides exit signal being associated with mixing of modes of the input optical signal.

The spatial light modulator (SLM) unit is generally located at output end (second end) of the MMF and is configured for applying spatial modulation to the exit light. The spatial modulation may be phase only, or phase and amplitude modulation, and may further select spatial light components to be included in output light signal. Selection of the spatial modulation is typically based on training for one or more tasks to be performed by the optical neuron unit. More specifically, when used in neural network configuration, the network generally undergoes training (e.g. in accordance with labeled data set). During training of the network, the varying parameters may be associated with spatial modulation of exit light from the different optical neuron units of the network.

The optical neuron unit of the present invention may further comprise input and/or output optical arrangements. Such input/output optical arrangements may generally be associated with one or more lenses configured for coupling optical signals into the MMF and/or out of the optical neuron unit, to thereby enable effective coupling between neuron units and reduce loses of optical energy that is not coupled into the MMF.

In some embodiments of the present invention, the artificial neuron unit may comprise a control unit which is functionally associated with the spatial light modulator. The control unit is in communication with the spatial light modulator unit to thereby operate the spatial light modulator. The control unit is configured for applying selective variation of the spatial modulation of the mixed exit light signal from the MMF. Generally, for neural network computation tasks, the network undergoes certain training process for determining internal connection and processing operations thereof. In some embodiments of the invention, selected training process is used for determining one or more light modulation patterns applied by the spatial light modulator on light exiting from MMF of an artificial neuron unit. Accordingly, the selection of the spatial modulation is determined at the control unit associated thereto in accordance with training of the artificial neuron unit of performing one or more tasks of interest.

The present invention in some other embodiments thereof comprises a feedback route optically associated with the first and second ends of the artificial neuron unit. The feedback route is configured to receive at least a portion of the exit light at the second end of the MMF, and for directing light components of the at least a portion of the exit light toward the first end of the artificial neuron unit for mixing at least a portion of the input light to thereby generate mixed input light. At least a portion of the mixed input light is coupled into the MMF. The feedback route further comprises an output port configured for providing output light being associated with at least one of the mixed input light and exit light of the MMF. Generally the spatial light modulator may be located at output port of the feedback loop for applying selected light modulation pattern to the output light. Alternatively or additionally, the spatial light modulator may be located at second end of the MMF configured for modulating exit light prior to coupling of the exit light to the feedback loop to provide modulation of the feedback route.

In this connection, in some configuration where output port of the feedback loop is configured for providing mixed input light as output of the artificial neuron unit, the artificial neuron unit may be configured with an auxiliary port (e.g. x-coupler fiber configuration). The auxiliary port is configured to receive light signals of the at least a portion of the exit light via the feedback and input light transmitted to the artificial neuron unit. The auxiliary port is further configured for mixing the light signals collected via the feedback and at least a portion of input and outputting the mixed light signals toward a selected target.

For complex computing tasks, a plurality of artificial neuron units may be associated together to provide a computing neural network. Such neural network is generally configured with selected sets of neuron units arranged in one or more layers. One or more neuron units of a top (input) layer are configured for receiving input signal (e.g. input light forming an image) and transmit corresponding intermediate output signals to neuron units of the next layer. Generally, the network as a whole is trained for performing one or more selected tasks. To this end the training may include arrangement of connections between neuron units of different layers as well as spatial light modulation on exit light of the different neuron units. This provides one or more layers of processing between the layers of the network providing output signals of the last (output) layer that is associated with processing results of the input light signal.

Accordingly, the neural network may include one or more optical elements selected and positions for properly manipulating light paths between neural units of the different layers. In some configurations such optical elements may be associated with input and/or output optical arrangements of the different neuron units. Accordingly, the input and/or output optical arrangements of the neuron units may be configured for coupling output light of one neuron unit into a corresponding neuron unit located in the next layer. Additionally, the neural network may also comprise reflective, refractive and/or diffractive optical elements selected for directing light between neuron units of different layers and for optimizing coupling of light into the neuron units. In some configurations, one or more neuron units of one or more layers may be replaced by a light transmitting optical elements other than the neuron units, such "passive" light transmitting element may be used for providing predetermined fixed optical manipulation of light passing therethrough. Generally for example, the neural network may include one or more beam splitter elements, lenses, wavelength and/or polarization selective filters etc. Arrangement of the optical elements of the network may be predetermined in accordance with network topology or selected in accordance with training for one or more computing tasks of the network.

Further, in some configurations, neuron units located in a common layer of the network may be associated with one or more common spatial light modulators. More specifically, a group of neuron units of the same layer may be arranged to be associated with a common spatial light modulator such that each neuron unit transmits exit light thereof toward a corresponding region of the spatial light modulator. Regions of the spatial light modulator associated with different neuron units may be spaced apart or partially overlapping. Accordingly when arranged in a neural network, light exiting from second end of the artificial neuron units is directed onto a region of spatial light modulator to provide output light of neuron units of the corresponding layer.

As indicated above, to provide efficient processing, a neural network generally undergoes certain training process. In the training process parameters of the network are selected in accordance with selected training process, e.g. including labeled or unlabeled data set. For example, the training may be based on input data forming one or more labeled data sets including information on input data pieces and corresponding expected output data for each input data piece. During the training process, connections between neuron units of the network and processing of each neuron unit may be varied to provide the desired output of the training data. Generally according to the present invention, the variation may typically comprise selection of spatial modulation patterns for exit light of the different neuron units.

To this end, the neural network may be associated with a control unit configured and operable for selectively determine spatial light modulation of the one or more spatial light modulators. The control unit may be functionally associated with the neural network and configured for receiving training related data associated with various output results for different input data pieces. The control unit may process the output results in accordance with expected output for each input data piece and selectively change spatial modulation for one or more of the different neuron units. The spatial modulation patterns may typically be varied along the training process iteratively to provide optimal processing of the training data set. Generally after completing training of the neural network, the spatial light modulation of the artificial neurons thereof do not vary, other than with adjustments of the network parameters or tasks.

In some configurations of the neural network, selection of the spatial light modulation associated with different neuron units may affect signal processing, e.g. by varying relation between input light signal and output light signal of the neuron unit, as well as affect connections between neuron units of the different network layers. More specifically, selection of spatial light pattern having certain spatial frequency may cause output light to propagate in a direction determined by the spatial frequency of the modulation. Thus the spatial light modulators of the different neuron units may also be used for directing light output from certain neuron unit along a selected general direction of propagation and/or direct the output light toward neighboring neuron units of the next layer.

Thus, according to a broad aspect, the present invention provides an artificial neuron unit for processing of input light, the artificial neuron unit comprises a modal mixing unit configured for receiving input light and applying selected mixing to light components of two or more modes within the input light providing exit light, and a filtering unit configured for applying preselected filter onto said exit light for selecting one or more modes of the exit light thereby providing output light of the artificial neuron unit.

The filtering unit may be configured as spatial light modulating unit, Sobel filter or other types of filtering.

According to some embodiments, the model mixing unit may be configured for mixing two or more modes being selected by at least one of the following: polarization orientation modes, wavelength ranges, spatial modes within a selected region and spatial modes within two or more cores of the model mixing unit.

The modal mixing unit may also be configured for applying linear mixing thereby providing said exit light being weighted linear combination of two or more modes of the input light.

According to some embodiments of the invention, the modal mixing unit is configured as a multimode optical fiber (MMF) having a first end and a second end, and being configured for receiving the input light at the first end, enabling propagation of the input light through the MMF while mixing spatial modes of the input light propagating in respective velocities within the MMF to yield an exit light, and for outputting the exit light at the second end; the filtering unit may be configured as a spatial light modulator (SLM), configured for imposing a selected spatially varying modulation on the exit light to yield an output light. The artificial neuron unit may also comprise an input optical arrangement, configured for coupling the input light into the first end of the MMF. The input optical arrangement may comprise one or more lenses. In some other embodiments, the filtering unit may comprise Sobel filter, being implemented optically or applied electronically on collected image data using one or more processing unit.

The artificial neuron unit may further comprise an output optical arrangement configured for interacting with the output light. The output optical arrangement may comprise one or more lenses.

According to some embodiments, the artificial neuron unit may further comprise, or be associate with, a control unit configured and operable for operating said spatial light modulator (SLM) and for determining spatial light modulation applied thereby. The control unit may be configured for selecting spatial modulation to output light in accordance with training process of a neural processing network comprising said unit.

According to some embodiments, the artificial neuron unit may further comprise a feedback route configured for receiving at least a portion of the exit light at said second end of the MMF and directing light components of said at least a portion of exit light toward said first end of the MMF for mixing said light components with at least a portion of input light, said feedback route being associated with an output port being associated with said spatial light modulator.

In some configurations, the output port of the feedback route is an auxiliary output port configured for outputting light signals associated with said mixing of said light components collected via the feedback route with at least a portion of input light. In some other configurations, the output port of the feedback route is configured for providing output associated with at least a portion of the output light.

Generally, according to some embodiments of the invention, the feedback route may further comprise gain unit and is configured for transmitting least a portion of the exit light through said gain unit for increasing intensity thereof. The gain unit may be located along optical path of propagation of light components through the feedback route and configured for amplifying intensity of light passing through the feedback route. The gain unit may be in the form of doped optical fiber directing optical path of light through the feedback route.

According to some embodiments of the invention, the artificial neuron unit may be used as pre-processing unit for neural network structure. The artificial neuron unit may be located at one or more input ports of a neural network structure and configured for applying selected pre-processing to light signals provided to a neural network processing structure. The use of the artificial neuron unit as pre-processing input unit for neural network enables mode-mixing of input signal and simplifying signal processing by the neural network. Generally, the use of multi-mode optical fiber may provide randomization and scrambling of the input data. This may enable the use of reduced number of nodes and provide neural network of lower complexity for given processing task.

According to one other broad aspect thereof, the present invention provides an artificial neuron unit for processing an input light, the artificial neuron unit comprising:
  a multimode optical fiber (MMF) having a first end and a second end, and being configured for receiving the input light at the first end, enabling propagation of the input light through the MMF while mixing spatial modes of the input light propagating in respective velocities within the MMF to yield an exit light, and for outputting the exit light at the second end; an input optical arrangement, configured for coupling the input light into the first end of the MMF; and a spatial light modulator (SLM), configured for imposing a selected spatially varying modulation on the exit light to yield an output light.

According to yet another broad aspect, the present invention provides an artificial neuron network, comprising:
  one or more artificial neuron units according to any one of the preceding claims;
  said one or more artificial neuron units being arranged in one or more neuron layers along a path of propagation of an optical signal, such that the optical signal is configured to propagate through the one or more artificial neuron units between input ports of artificial neuron units of an input layer to output ports of artificial neuron units of a output layer providing output signal of said network.

The artificial neuron network may further comprise one or more feedback route configured for receiving at least one portion of output light from at least one output port of an artificial neuron unit of said output layer and directing at least a portion of the output light for mixing with at least a portion of input light directed at artificial neuron units of the input layer, and for outputting at least a portion of the mixed light.

According to some embodiments, the feedback route comprises: a feedback unit, configured for receiving the output light;
  an X-coupler having a first and a second input end and a first and a second output end, and configured for receiving the at least one portion of output light from the feedback unit via the first input end, receiving the input light in via the second input end, mixing the input light and the output light to yield the mixed light, directing the at least first portion of the mixed light into the MMF's first end, and outputting the at least a second portion of the mixed light.

The artificial neuron network may further comprise an all-optical light modulator located at second output end of the X-coupler, said all-optical light modulator being configured as a liquid crystal valve.

The artificial neuron network may further comprise a nonlinear light modulator located at second output end of the X-coupler and configured for applying one or more nonlinear interactions to light components passing therethrough, said one or more nonlinear interactions comprises at least one of second harmonic generation, sum frequency generation, difference frequency generation.

According to some embodiments, the feedback route comprises:
- a first semi-transparent mirror located near or at the second end of the MMF; and
- a second semi-transparent mirror located near or at the first end of the MMF;

wherein:
- the first mirror is confirmed for reflecting the at least one portion of the output light back into the second MMF, such that the at least one portion of the output light enters the MMF via the second end and exit the MMF via the first end;
- the second mirror is configured for reflecting the at least one portion of the output light back into the MMF via the first end, while transmitting at least one portion of the input light into the MMF via the first end, such that the at least one portion of the input light and the at least one portion mix in the MMF yielding mixed light;
- the first mirror is configured for transmitting at least a portion of the mixed light, such that the artificial neuron network is configured for outputting the at least one portion of the mixed light.

According to yet some embodiments of the invention, the feedback route comprises one or more optical fibers configured for directing said at least a portion of the output light for mixing with said input light. The one or more optical fibers may comprise one or more of: single-core fiber, multi-core fiber, and a bundle of optical fibers.

According to yet another broad aspect, the present invention provides an artificial neuron network, comprising:
- a plurality of artificial neuron units configured as described herein, the artificial neuron units being arranged in one or more layers comprising:
  - a first layer of the artificial neuron units comprising one or more artificial neuron units and configured for receiving input light and for transmitting intermediate output light to artificial neuron units of one or more following layers of artificial neuron units;
  - additional one or more layers configured for receiving intermediate output light of one or more preceding layers of artificial neuron units;
  - the output light from the last one of the of the artificial neuron units layers is directed to a desired target.

According to yet another broad aspect, the present invention provides an artificial neuron network configured for processing an image, the artificial neuron network comprising:
- an array of a multimode optical fibers (MMF), each MMF having a respective first end and a respective second end, the MMFs being arranged such that all first ends are aligned with each other in a first desired shape in order to receive respective input light portions from a scene and such that all the second ends are aligned in a second desired shape to direct respective exit light portions to a desired target to form an output image of the scene at the target;
- each MMF provides for directing propagation of light components therethrough while mixing spatial modes of the light components with respective front shapes and respective velocities, to thereby yield an exit light portion, and for outputting the exit light portion at the respective second end;
- at least one input optical arrangement device, configured for coupling the input light portions into the array of MMFs; and
- at least one spatial light modulator (SLM), configured for imposing a spatially varying modulation on the exit light portions to yield output light portions.

According to some embodiments, the artificial neuron network may comprise a plurality of input optical arrangement devices, wherein at least some of the input refractive devices are associated with respective MMF's and are configured for coupling the input light portions into the respective MMFs.

According to some embodiments, the artificial neuron network may comprise a plurality of SLMs, wherein at least some of the SLMs are associated with respective MMF's and are configured for imposing respective spatially varying modulations on the exit light portions from the respective MMFs to yield respective output light radiation portions.

According to some embodiments, the artificial neuron network may comprise a series of arrays of MMFs, the arrays being arranged in series with each other, such that output light from a previous array is used as an input to a following array. The artificial neuron network may further comprise an intermediate optical unit located between at least two arrays. The intermediate optical unit may comprise at least one of an intermediate refractive unit and an intermediate SLM.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A illustrates optical fiber based feedback route and FIG. 2B illustrates free space propagation based feedback route;

FIGS. 8A to 8D showing experiments results relating to error of reconstructions with respect to hidden layer size reconstruction ANN; FIG. 8A shows test error as a function of the number of nodes; FIG. 8B shows ratio of required nodes without input using artificial neuron unit for achieving similar precision; and FIGS. 8C and 8D show error levels with respect to hidden layer size for images of different input size;

FIG. 10A shows mean square error (MSE) as function of code layer size for each color; FIG. 10B shows accuracy performance of the test reconstruction ANN applied on the reconstructed images; and FIG. 10C shows error rate as function of LED current.

DETAILED DESCRIPTION OF EMBODIMENTS

Figure 1:
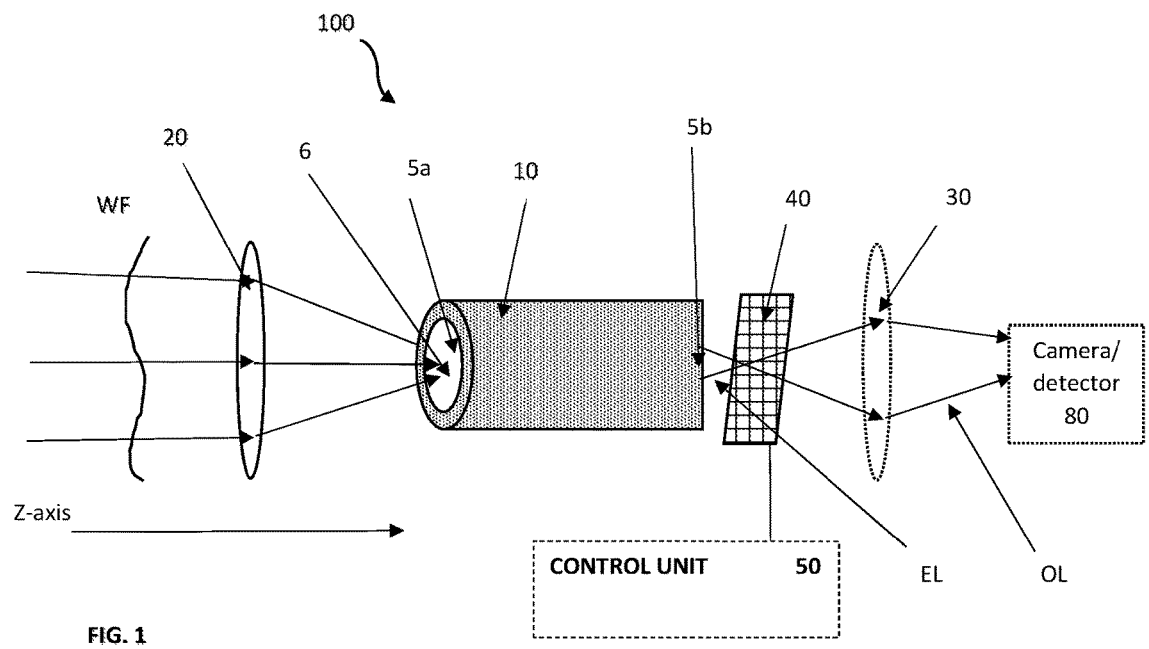
FIG. 1 illustrates an artificial neuron unit according to some embodiments of the present invention.

As indicated above, the present technique provides an artificial neuron unit suitable for operating in neuron network computing system. The artificial neuron unit of the present invention is configured for providing optical processing of input optical signals for providing output optical signals in accordance with training of the neuron unit/network. FIG. 1 depicts an artificial neuron unit 100 according to some embodiments of the invention. The artificial neuron unit 100 is based on a multi-mode fiber (MMF) 10, or generally at least one as described further below. The MMF 10 has a first end 5a (i.e. input end) and second end 5b (i.e. output end), and is configured as an optical fiber having single wide core 6. Additionally, the artificial neuron unit 100 includes a spatial light modulator 40 located in optical path of light out coupling from the MMF 10 at the second end 5b thereof. In some configurations, the artificial neuron unit may also include input optical arrangement 20 configured for coupling light into the MMF 10. Additionally the artificial neuron unit 100 may also include output optical arrangement 30, and/or be associated with one or more of control unit 50 and detector unit 80.

The artificial neuron unit 100 is configured for receiving input light WF signal, typically coupled into the MMF 10 by the input optical arrangement, propagating the input light WF through the MMF to apply certain mixing to spatial modes of the input light signal WF and to provide exit light EL at the second end 5b of the MMF. The exit light EL is selectively modulated by the spatial light modulator 40 in accordance with selected operation/task of the artificial neuron unit, to which the neuron unit is trained, providing output light signal OL. In this connection, it should be noted that generally processing techniques using neural-type configurations are based on one or more networks of neuron units. Such networks undergo selected training process in which internal connections, processing parameters are being determined. It should be noted that the artificial neuron unit 100 described herein may be used in various network topologies. For simplicity, the artificial neuron unit 100 is described herein as a processing unit where selected optical manipulations may be performed by mixing of spatial modes of input optical signals WF and by applying spatial modulation pattern to exit light EL. Generally, selection of the spatial modulation pattern of the spatial light modulator 40 is selected by control unit 50 associated with the artificial neuron unit 100 or with a network including the unit 100, in accordance with suitable training process.

The MMF 10 is a multi-mode fiber having selected length (e.g. a few millimeters to a few centimeters) and diameter (e.g. 30 micrometer or more, 50 micrometer or more) and is typically configured to support propagation of light in selected wavelength range (e.g. 1.5 micrometer) propagating with plurality of spatial modes. Generally input optical signal is coupled into the MMF 10 at the first end 5a thereof. The optical signal propagated through the MMF 10 while experiencing certain mixing between spatial modes providing exit light EL at the second end 5b.

Generally, input optical signal having certain wavefront WF, amplitude and length characteristics is transmitted to the artificial neuron unit 100. The input optical signal WF is coupled into the MMF 10 by the input optical arrangement 20 and allowed to propagate in the MMF 10 toward the second end 5b thereof. While propagating through the MMF 10 the different spatial modes of the optical signal (corresponding to spatial shape of the input light wavefront WF as projected onto structure of the MMF 10) propagate at different velocities and undergo mixing between them. As the MMF 10 is relatively short, with respect to group velocity dispersion properties of the MMF 10, the exit light EL maintains most of its characteristics but may have different wavefront structure. The exit light EL is directed toward the spatial light modulator 40, which applies selected spatial modulation to the wavefront providing output light signal OL. The output light signal OL may then be directed to one or more additional neuron units associated with additional layers of the network, and/or to a corresponding detection unit 80.

Generally, for simplicity the terms "exit light" and "mixed exit light" as used herein interchangeably refer to exit light EL (e.g. signal wavefront) coupled out of the second end 5b of the MMF 10 after propagating through the MMF 10 before reaching the SLM 40. The term "output light" as used herein refers to light OL output of the artificial neuron unit, i.e. exit light modulated by the SLM 40 in accordance with selected spatial modulation.

The input optical arrangement 20 is typically located in the vicinity of input end 5a of the MMF 10, and configured for coupling input light WF into the MMF 10. Generally the input optical arrangement includes one or more optical elements such as one or more lenses (e.g. objective lens unit). The input optical arrangement may preferably be configured for coupling input light WF while not affecting wavefront structure thereof. As indicated above, in some configurations, the artificial neuron unit may also include an output optical arrangement 30 located downstream of the MMF 10, e.g. between the MMF 10 and SLM 40 and/or downstream of SLM 40. The output optical arrangement 30 may generally be configured of one or more optical elements such as lenses. The output optical arrangement is typically configured for collecting output light OL from the artificial neuron unit and affect divergence and/or direction of propagation of the output light OL (e.g. provide collimated output light) in accordance with selected path of output light OL toward detection unit 80 and/or additional one or more neuron units.

Figure 2A:
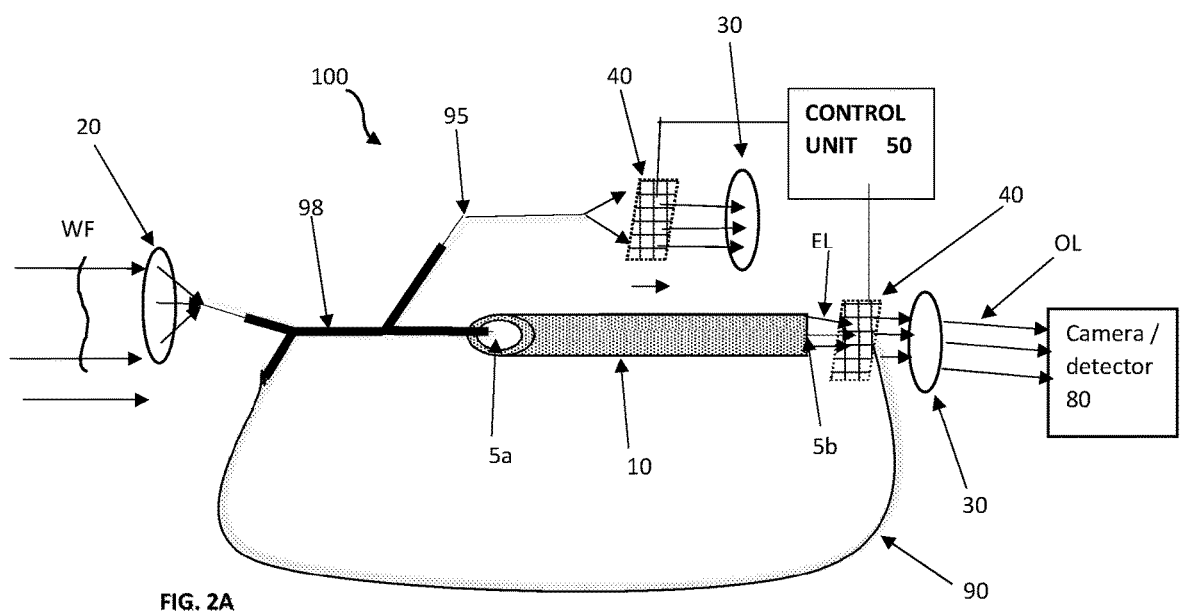
FIGS. 2A and 2B illustrate two examples of artificial neuron units including feedback route configuration for processing of exit light.
Figure 2B:
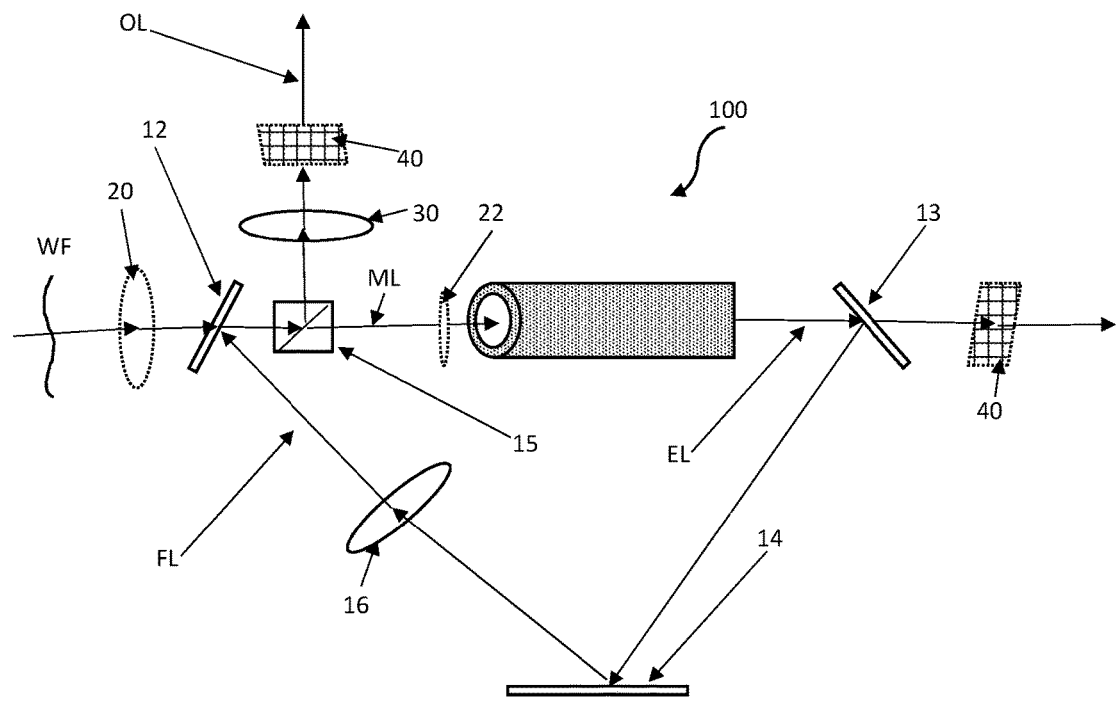

Reference is made to FIGS. 2A and 2B illustrating two examples of feedback loop type processing layer utilizing artificial neuron unit according to some embodiments of the invention. FIG. 2A illustrates optical fiber based feedback route and FIG. 2B illustrates free space propagation type feedback route. As shown in FIG. 2A, the artificial neuron unit 100 includes MMF 10 and corresponding input optical arrangement 20. The artificial neuron unit 100 further includes a feedback route 90 configured as optical fiber bundle including one or more optical fibers and located for receiving light components from second end 5b of the MMF 10 and direct the received light components to be mixed with the input optical signal WF, providing mixed light. To this end, the feedback route configuration may generally include an X-coupler unit 98 receiving input light WF and light components from the feedback route and for mixing the two inputs. The X-coupler generally transmits a portion of the mixed light into the MMF 10 via the first end 5a thereof, and another portion toward an output port 95 to provide exit light.

The feedback rout 90 is configured for collecting components of exit light EL from the second end 5b of the MMF 10 (generally prior to the spatial light modulator 40) and direct the collected components toward an X-coupler 98 where the light components mix with input light WF providing mixed input light. The mixed input light is coupled to the first end 5a of the MMF 10. Further, another portion of the mixed light may be directed toward an output port 95 transmitting light components from the feedback route 90 toward one or more corresponding SLM 40 to provide modulated output light OL. It should be noted that feedback route 90 may be configured to provide intermediate output port located between second end 5b of the MMF 10 and X-coupler 98, or prior to light coupling into the feedback route 90, for directing a portion of the exit light EL toward the SLM 40, while transmitting other portions of the exit light EL to the mixing port 98 to be mixed with input light WF. Additionally or alternatively, the output port 95 may be located downstream of the X-coupler 98 directing mixed light toward the SLM 40 to provide output light OL in the form of modulated mixed input light.

The feedback route 90 may also be configured as free space propagation route, this is exemplified in FIG. 2B illustrating artificial neuron unit 100 associated with feedback route. To this end, a first at least partially reflecting unit 13 (e.g. semi-reflective mirror) is located in optical path of exit light EL exiting from the second end 5b of the MMF 10. Mirror 13 is position for collecting exit light EL and reflecting at least a portion of exit light EL toward partially reflecting mirror 12 located in vicinity of the first end of the MMF 10 and positioned for directing the light components to be coupled into the MMF 10. The feedback route may also include one or more mirrors 14 and poetical elements 16 configured and positioned for maintaining wavefront structure and directing the feedback light components FL to be re-coupled into the MMF 10.

Generally input light WF is propagating next to, or transmitted through, the partially reflecting mirror 12 and is mixed with light components arriving from the feedback route providing mixed light components ML. Generally in some configurations, the neuron unit may include beam splitting element 15 configured for receiving mixed light ML and for transmitting a portion of the mixed light ML to be coupled into the MMF 10 (e.g. via coupling optical arrangement 22), and another portion of the mixed light ML toward an SLM 40 providing output light OL. As indicated above, an output optical arrangement 30 may be located upstream or downstream of the SLM 40 for affecting beam diameter, divergence etc.

Thus, the feedback route may generally be configured for directing collected light components toward input end of the MMF 10 to thereby enable interference/correlations between signal portions at a delay time selected in accordance with optical path of the feedback route. Generally the feedback route may be configured for maintaining spatial structure of the exit light EL. This may be provided using suitable optical arrangement (e.g., fiber bundle, free-space propagation path etc.) collecting portions of exit light EL and affecting divergence of the exit light EL forming collimated light. The collimated light may than be directed for free space propagation toward the mixing port 98 or coupled into optical fiber bundle of the feedback route 90 to be transmitted to the mixing port 98. In some other embodiments the SLM 40 is located at the second end 5b of the MMF 10 for imposing selected spatial modulation to the exit EL light prior to coupling of the exit light EL to the feedback loop 90. In some configurations, the feedback route may include selected gain medium for increasing signal intensity.

Figure 3:
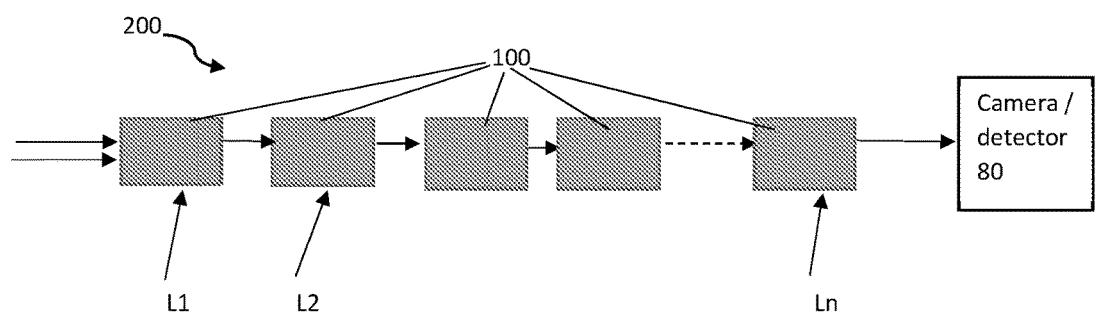
FIG. 3 illustrates a chain-type neural network according to some embodiments of the present invention.

Reference is made to FIG. 3 illustrating an example of a multi-layer artificial neuron network 200 of point-like (zero) dimension according to some embodiments of the present invention. The artificial neuron network 200 exemplified herein is configured for optical processing of an optical signal. It should be noted that the input optical signal, as well as the processing output, may generally have certain two-dimensional configuration supported by the multi-mode optical fibers of the neural network. In this example, the neural network is formed by a plurality of artificial neuron units 100 arranged in layers L1, L2. Ln such that output light of one artificial neuron unit is coupled into artificial neuron unit of the next layer. The layers of the neural network 200 are generally arranged along general direction of propagation of light passing through (and being processed by) the network. Such direction of propagation may be curved in accordance with optical elements used along the layers of the network as well as by selected spatial light modulations directing optical signals between layers.

The artificial neuron units 100 of the network 200 are configured such that the first neuron unit L1 received input optical signals, and after mixing of spatial modes and applying selected spatial modulation, the output signals of unit L1 are transmitted to be coupled into neuron unit L2, and so on until the last neuron unit Ln of the output layer. As indicated above, the spatial light modulation of the different neuron units is selected in accordance with training of the network to provide suitable/correct processing of input data. It should be noted that is some configurations, one or more of the neuron units 100 may be associated or include a feedback route as exemplified in FIGS. 2A and 2B. Generally such feedback route may be single neuron feedback or provide feedback along a chain of two or more neuron units.

Although not specifically shown in FIG. 3, the neural network 200 may be formed with topology having varying dimensionality between layers. More specifically, input layer of a single neuron unit L1 may transmit intermediate output into a second (hidden) layer including two or more neuron units. Further, a layer having two or more neuron units may be positioned and arranged to transmit intermediate output light to another layer having reduced number (e.g. one) of neuron units. Generally topology of the network may be determined in accordance with physical constructions and arrangement of the artificial neuron units thereof. Actual propagation of signals may be determined by training and selection of the spatial light modulation of each neuron unit, such that certain signals may be directed toward a different route than other signals in accordance with mixing of the spatial modes and the modulation provided by the spatial light modulators.

Generally, as indicated above, each layer of the network 200 includes one or more neuron units arranged in a preselected arrangement (having selected dimensionality and topology) configured for receiving optical signal by the input ports of the neuron units and transmitting output optical signal by the output ports of the neuron units to the proceeding layer such that the optical signal is configured to propagate through the one or more artificial neuron units between input ports of artificial neuron units of an input layer L1 to output ports of artificial neuron units of a output layer Ln providing output signal of the neuron network 200.

It should be noted that each neuron unit 100 of the network 200, is configured for receiving optical signals (e.g. input signal or from one or more neuron units of a preceding layer), apply mixing of spatial modes of the optical signal and selected spatial modulation of the exit light and transmitting (intermediate) output optical signals to one or more neuron units 100 of a proceeding layer. To this end, the optical signals may be directed between layers by free space propagation, e.g. using input and output optical arrangement of the neuron units for coupling to proceeding layer, as well as utilizing optical fiber bundles for directing the intermediate output light while maintaining spatial features thereof. Various additional optical elements may also be used for maintaining propagation path and corresponding with physical arrangement of the network 200.

Generally the neural network may include one or more additional optical processing units such as integrated optical module as described in WO 2017/033197. To this end one or more optical modules including multi-core fiber bundle may be used in one or more layers of the neural network, enabling various additional processing capabilities to the neural network.

Figure 4:
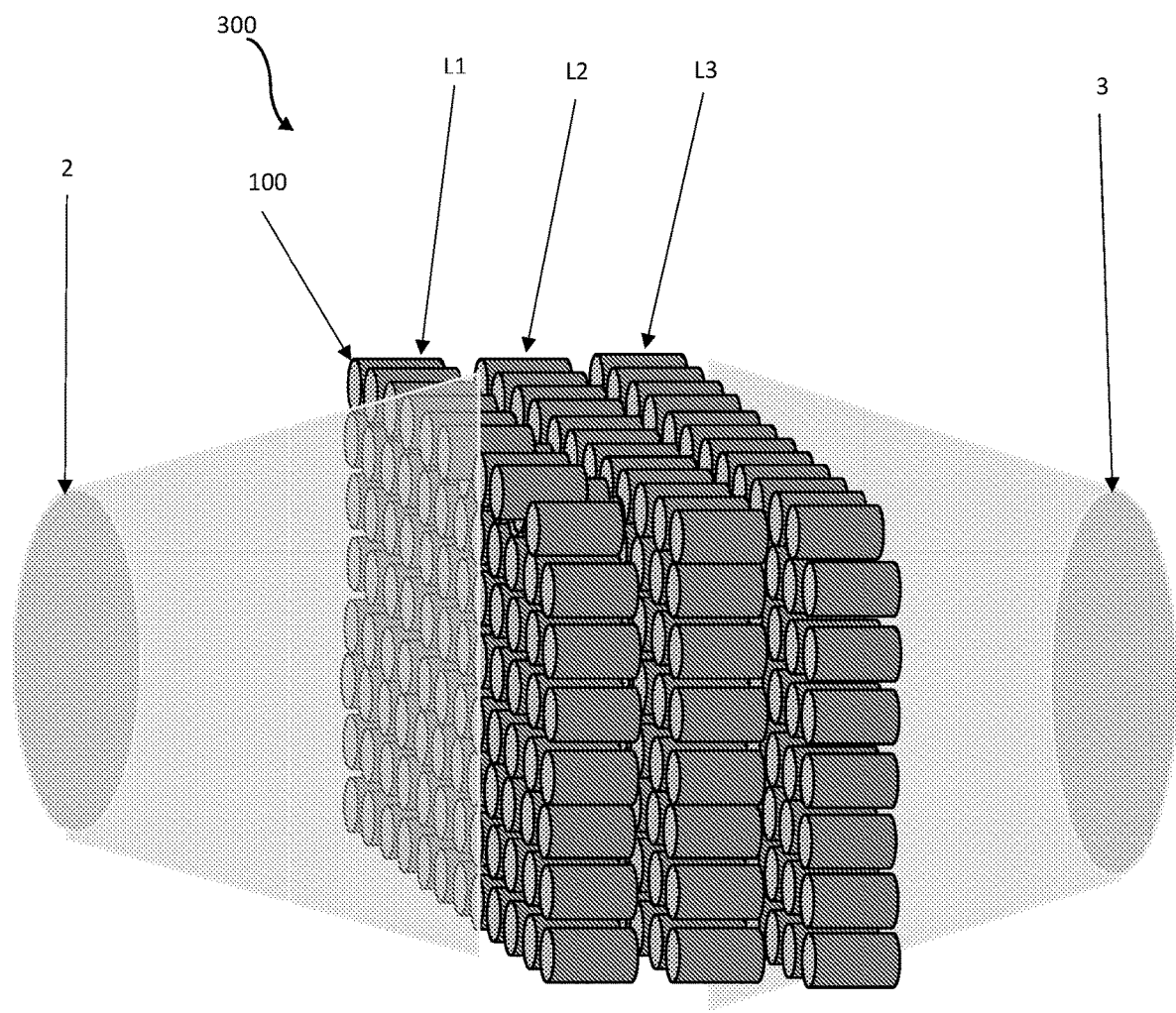
FIG. 4 exemplifies two-dimensional neural network configuration according to some embodiments of the present invention.

An additional configuration of a neural network is exemplified in FIG. 4. In this example, the neural network 300 includes three layers L1-L3, each having two-dimensional arrangement of neuron units 100 in a cascade arrangement. The neural network shown here includes a global input optical arrangement 2 configured for receiving input optical signal and directing it, e.g. by diverging or focusing the light, toward the input ends of the neuron units 100 of the first (input) layer L1. For example, optical arrangement 2 may be configured for directing input optical field to form an image at selected plane associated with input ends of the layer L1 to thereby form light field wavefront associated with an image to be processed. The neural network 300 may also include an output optical arrangement 3 configured for collecting output light from the output layer (L3 in this example) and direct it toward a collection/detection unit. For example, the output optical arrangement may be configured for imaging a plane associated with output plane of the neural network 300 onto a detection unit. As described above, spatial modulation of each of the neuron units 100 is generally determined in accordance with training of the network for one or more selected tasks.

Figure 5:
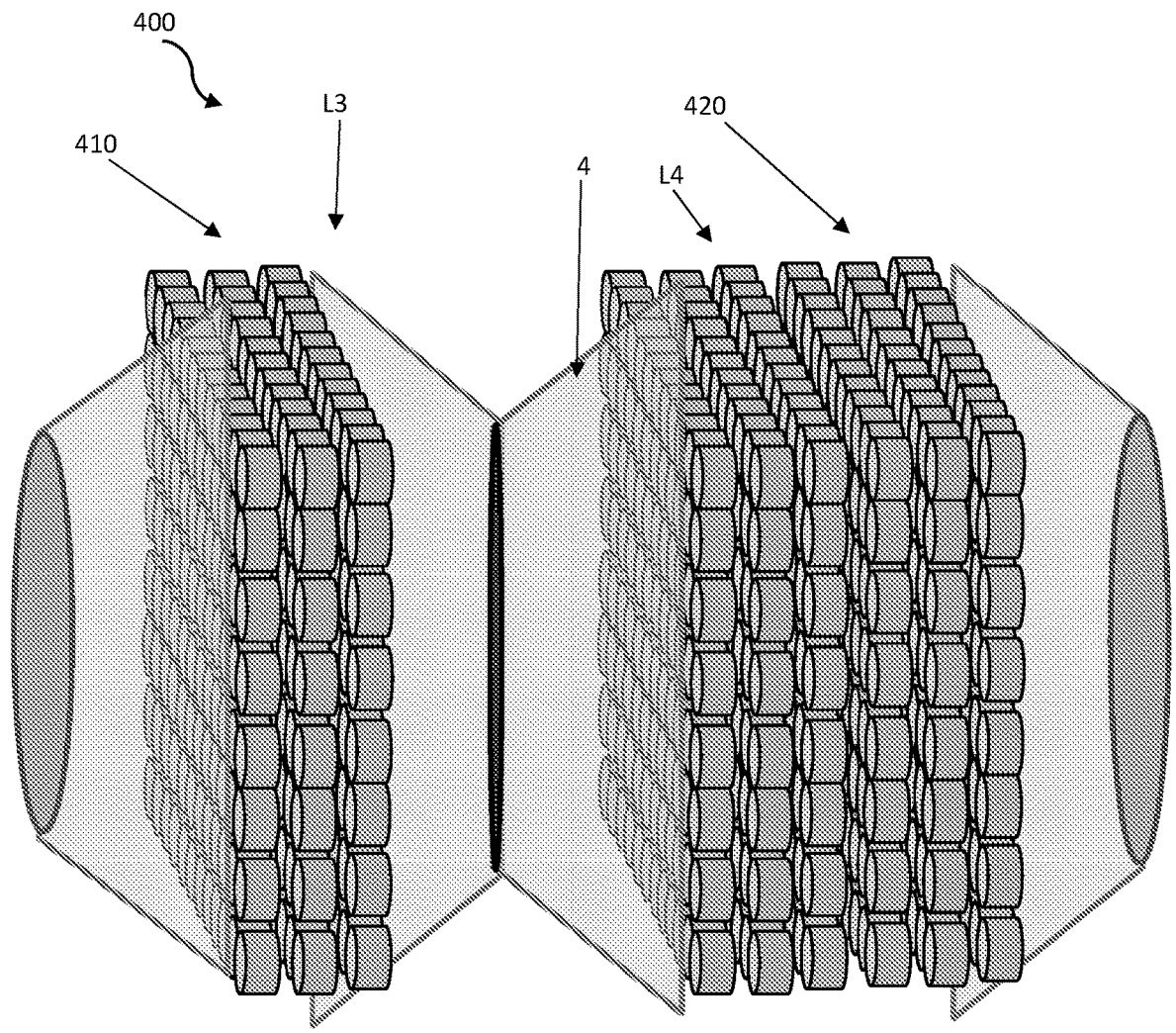
FIG. 5 exemplifies an additional two-dimensional neural network configuration using intermediate signal mixing arrangement according to some embodiments of the invention.

An additional network configuration is exemplified in FIG. 5. In this example, the neural network 400 is configured as a cascade of two sub-networks 410 and 420 having optical arrangement 4 located between the sub-networks. The optical arrangement 4 may be a lens arrangement providing imaging or Fourier imaging of intermediate output (e.g. of layer L3) to the proceeding layer L4. Additionally or alternatively, the optical arrangement 4 may include spatial light modulator having selected or predetermined pattern that is applied to intermediate light signals.

The neural network layers exemplified in FIGS. 4 and 5 may also be configured where one or more of the layers, or of the neuron units is formed by a multi-core multi-mode optical fiber. More specifically, such multi-core multi-mode fiber may include a plurality of optical fiber cores, having first coupling rate between them, where each of the cores is a multi-mode fiber (MMF). Accordingly input light may be separated into the different cores and allow two or more mixing rates between modes of each core as well as between light portions of the different cores.

Generally as indicated above, it should be noted that the configurations of neural networks as exemplified herein may be associated with corresponding control unit, e.g. computer system, configured for managing training process and determining operation of the spatial light modulators. The control unit is not specifically shown other than in FIGS. 1 and 2A-2B, as it relates to selection of the spatial light modulation pattern and the training of the network. It should however be noted that in some configuration the control unit may also be connected to a detection system and configured for receiving data about output of the neural network. In these configurations the control unit may also apply selected processing to the received data and generate corresponding output. Although using electronic processing by the control unit, the neural network configuration according to the present technique is generally all optical and does not need intermediate optical-electronic signal conversion other than possible detection of the output data.

Figure 6:
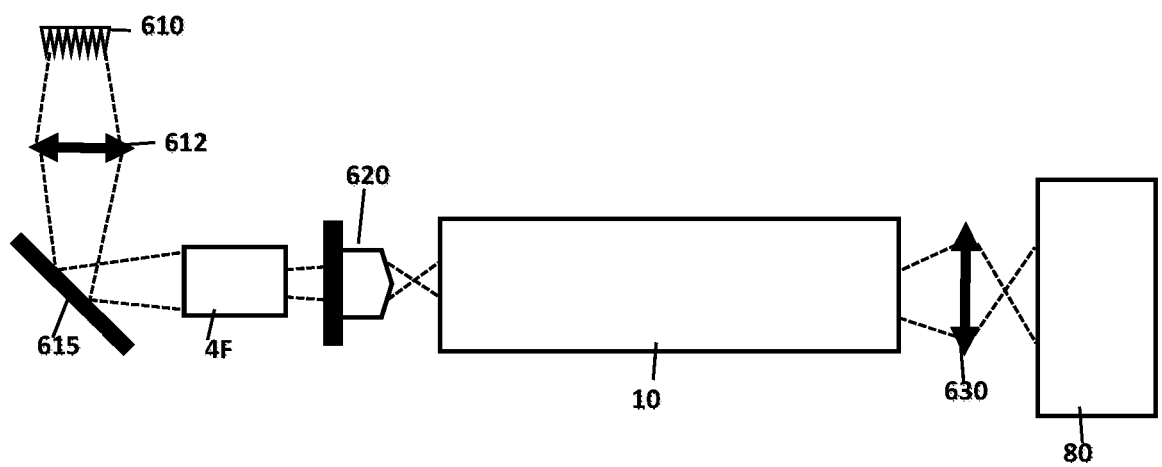
FIG. 6 illustrates an exemplary experimental system using artificial neuron unit according to some embodiments of the invention for optimizing image data pre-processing.

To illustrates capabilities of the artificial neuron unit described herein, the inventors of the present invention have conducted several experiments presenting an imaging system that uses a multimode fiber to enable a real learning task in such a simple neural network. Reference is made to FIG. 6 illustrating the experimental system including a RGB DLP projector with three Light Emitting Diodes 610 configured to illuminate a digital mirror device DMD 615 via lens 612. The DMD 615 is configured to reflect selected spatial light pattern defining an image through 4F lens system to objective lens 620 which couples the image into the multimode optical fiber 10. Light output from the MMN 10 is collected via output lens 630 and detected by camera unit 80. The system also includes a Sobel filter applied on exit light as collected by camera unit 80.

The experimental system exemplified in FIG. 6 is used with ANN to reconstruct or identify multimode fiber images. Differently than conventional neural network processing, the present technique provides as all-optical design. Generally, projecting the image to the multimode fiber space may enable reducing the number of nodes significantly. Thus, the system showed in experimental data less than 5 percent error rate using less than 30 nodes in identifying digit images taken from Modified National Institute of Standards and Technology database (MNIST). This is while an ideal system that does not use a multimode fiber may typically require more than twice this amount. Moreover, the present system is operated using polychromatic non-coherent illumination allowing to further reconstruct the multimode image back to the original with color, for further imaging purposes.

In the experimental setup RGB DLP projector with three Light Emitting Diodes (LEDs) 610 is illuminating the DMD 615 to provide selected images. The projector 610 is configured to emit light at three prime colors including Red (amber) at 624 nm with bandwidth of 18 nm (measured with full width half maximum (FWHM), Green with wavelength of 500-600 nm, and Blue at 460 nm with bandwidth of 25 nm. The DMD 615 includes an array of 608×684 diamond pixels and has an area of 0.3 inch. The DMD 615 determines gray level of each pixel by controlling mirrors' swinging frequencies. A 4F optical system is positioned to scale the DMD image such that after coupling to the optical fiber 10 via objective lens 620 to fill the back focal plane of the objective lens coupling light into the fiber 10. The optical fiber 10 has a core diameter of 50 µm and length of 18 cm. This provides the optical fiber 10 supporting approximately 6000 spatial modes for the red light, 6000-9000 spatial modes for the green light and 10,000 spatial modes for the blue light, given by $N=(2\pi r)^2/2\lambda^2$, where r is the radius of the fiber 10, $\lambda$ is wavelength and N is the number of spatial modes.

The position of the optical elements is directed to provide the image of the DMD 615 to fill the cross-section of the optical fiber 10. Thus, distance between the DMD 615 to the 4F system left focal plane (marked by u), and the distance between the objective and the proximal end of a multimode fiber (marked by v) are determined by:

$$M = \frac{\text{Fiber size}}{\text{DMD size}} = \frac{f_{objective}}{f_{objective} - (u+v)} = \frac{v - f_{objective}}{f_{objective}}$$

Standard MNIST (Modified National Institute of Standards and Technology database) scores were chosen as a benchmark to test the performance of artificial neural network combined the optical fiber system described herein (ANN-OFS). The MNIST benchmark tests the ability of a machine learning platform to identify images of handwritten digits. Execution of the MNIST protocol included two groups of intensity images that were projected using the DMD. The first group of 60,000 images was used as the training set for the artificial neural network. The second group of 10,000 images was used as the validation and test sets to assess the network's performance Each image from the two sets was projected on the proximal end of the MMF 10 and the correspondent distal end intensity image was acquired.

Two types of ANN were trained and tested numerous times (solved each time starting from scratch). A first ANN (denoted as ANN-OFS) was trained and tested using the output images at the distal end of the MMF, i.e. collected by camera 80 in FIG. 6. The second ANN (denoted as Original-ANN) was trained and tested using the original MNIST images for comparison. Both ANNs have the same architectures and the same hyper-parameters. The training set images were used with or without pre-processing. The pre-processing steps included: image rescaling from the original captured image of 96×96 pixels to 28×28, 48×48 and 64×64 pixels using averaging down sampling for performance of comparison with different image conditions and complexity; and Sobel kernel filtering testing optimization conditions of the network performance.

The training set images were randomly divided to 48,000 images designated for network training, and 12,000 images for network training inner process validation that prevents the network from overfitting. Scaled conjugate descent (SCD) algorithm was applied to solve a simple ANN with one hidden layer with 8 to 96 nodes and cross-entropy loss function.

The distal images of the validation set, obtained after propagating through the MMF 10 were used as inputs for the ANN-OFS. Finally, the digit identification success percentage was used as a figure of merit for the network performance.

Figure 7:
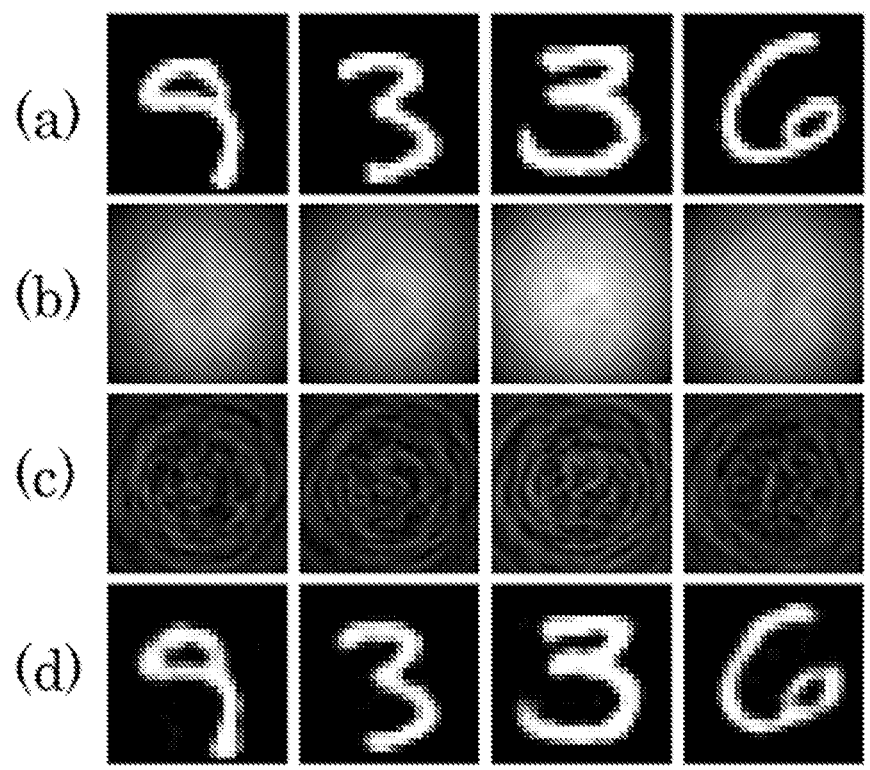
FIG. 7 shows MNIST images used for experimental data (row a), images obtained after propagation of the light associated with the image through the MMF (row b), imaged after filtering by Sobel kernel (row c) and reconstructed images (row d)

To test our assumptions that the multimode fiber might accommodate better performance in standard image identification procedures, MNIST images were projected on the fiber end. FIG. 7 exemplifies typical MNIST images in row (a), image obtained after propagation of the light associated with the image through the MMF 10 in row (b), Sobel kernel filtered image in row (c) and reconstructed image in row (d). The reconstructed images in row (d) were reconstructed using "autoencoder" neural network as described in more details further below.

As shown, coupling the images into the multimode fiber 10 transforms them as they are projected onto the multimodal space. At the output of the fiber 10 the transformed modal nature of the images is captured at the spatial plane of the camera shown. Row (b) in FIG. 7 shows typical scattering image that matches the letter symbol projected on the same column in row (a), this is non-speckle image as the illumination source was non-coherence. Sobel kernel was utilized to filter the fiber output images as shown in row (c) and used to improve the system's performance.

Analyzing the MNIST test shows that projecting the images onto the fiber space reduced the number of necessary nodes for this specific neural network architectures. Reference is made to FIGS. 8A to 8D showing summary of experiments results indicating error of reconstructions with respect to hidden layer size of the ANN. FIG. 8A shows the given test error as a function of the number of nodes, using 28×28 size images as input. FIG. 8B shows the ratio of the required nodes without fiber input for achieving similar precision. FIG. 8B shows the ratio of the required nodes without fiber input for achieving similar precision. FIGS. 8C and 8D show error with respect to hidden layer size for images of different input size indicating no significant effect on the results. As can see from FIG. 8A, for the same number of nodes, transmitting the image through the fiber yielded the lowest error. Further, as shown in FIG. 8A, the Sobel filter (marked as fiber with filter) provides even better performance on the small size networks. In this connection, it should be noted that optical filtering providing Sobel filter may be used at output of the MMF 10, i.e. filtering exit light.

Additional "autoencoder" neural network was used to exemplify reconstructions of images encoded by the MMF 10 as described herein. The network architecture was used to reduce data dimensionality and to reconstruct the original image from light pattern collected after propagating through MMF 10. The "autoencoder" neural network contains two layers, encoder layer that compresses the data to the code layer size, and decoder layer that reconstructs the image from the code. The reconstruction (autoencoder) network was trained on the MNIST images from the training set, when the input is the images captured from MMF distal end (i.e. exit light), and the target output are the projected images. The network used MSE (mean square error) loss function, the activation function used are 'Relu' in the encoder layer and 'Sigmoid' in the decoder layer. After training on the MNIST training dataset, the model was tested on new images from the test dataset.

Referring back to FIG. 7, row (d) therein show reconstructed images after training of the neural network using the training image set. The input images used were the fiber filter images shown in row (c), and the target images are shown in the top row (a). As can be seen, the reconstruction provides high resemblance to the original "target" images.

Figure 9:
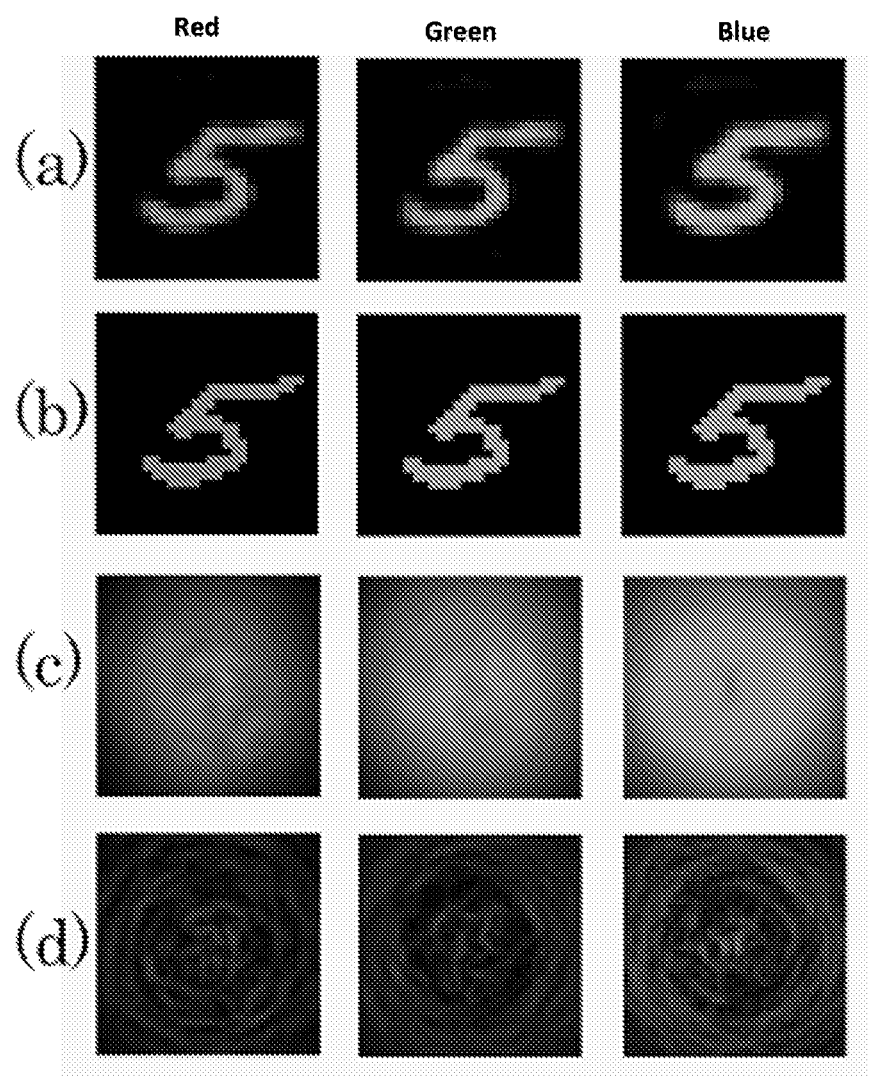
FIG. 9 shows experimental results for image reconstructions in different illumination wavelength including Red, Green and Blue illumination; the figure shows image projected by the DMD (row a), shows reconstructed images (row b), shows exit light image (row c) and shows filtered exit light using Sobel filter (row d)
Figure 10A:
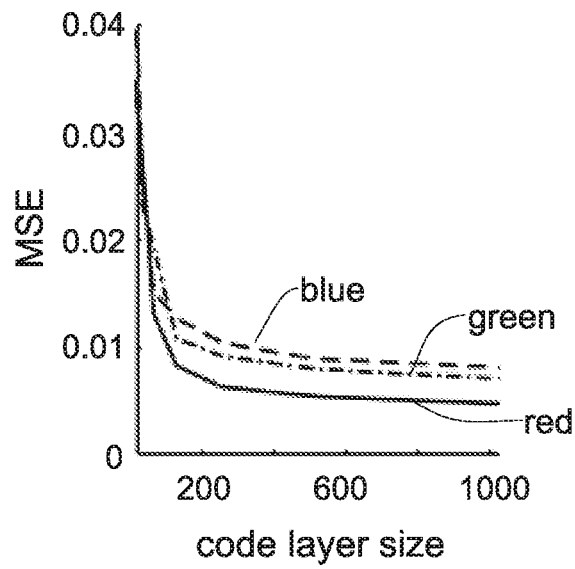
FIGS. 10A to 10C show reconstruction results of filtered exit light.
Figure 10B:
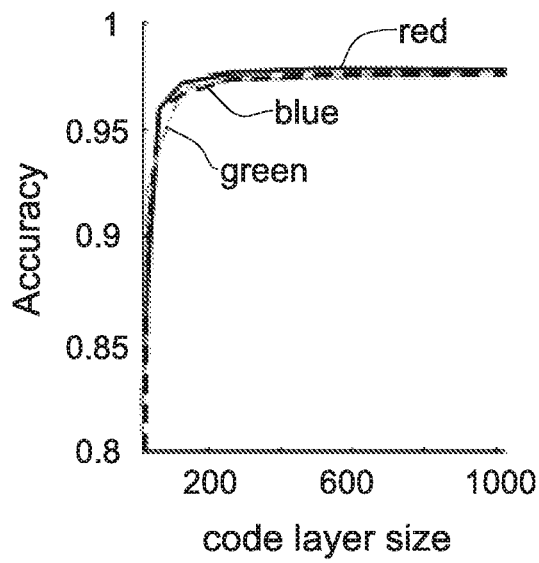
Figure 10C:
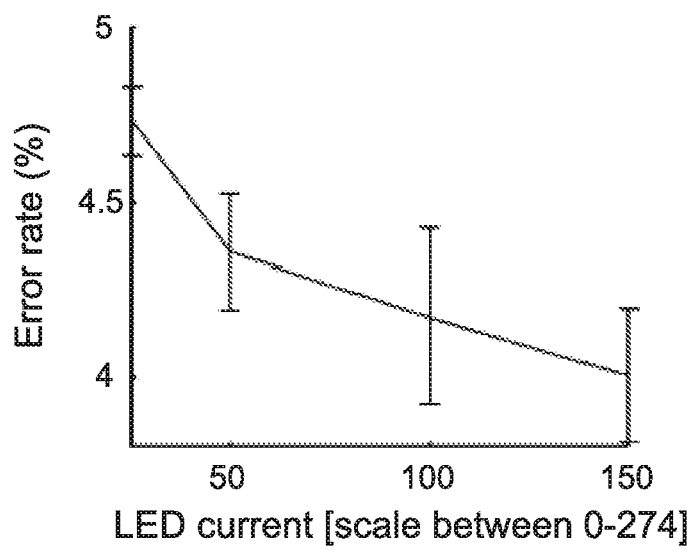

Reference is also made to FIG. 9 showing experimental results for image reconstructions in different illumination wavelength including Red, Green and Blue illumination as indicated above, row (a) shows image projected by the DMD 615, row (b) shows reconstructed images, row (c) shows exit light image and row (d) shows filtered exit light using Sobel filter. To this end three neural networks were trained or MNSL images in the different wavelengths (colors). FIG. 9 shows efficient and accurate reconstructions in different wavelength. FIGS. 10A to 10C show reconstruction of filtered exit light, i.e. exit light with Sobel filter. FIG. 10A shows mean square error (MSE) as function of code layer size for each color, the MSE is normalized between 0 and 1. FIG. 10B shows accuracy performance of the test ANN applied on the reconstructed images. FIG. 10C shows error rate as function of LED current, this was tested on ANN with hidden layer contained 30 nodes, and camera exposure time is 20 ms using 624 nm amber LED.

As shown in FIG. 10A the MSE decreases with increase in wavelength of the light (blue to red). This may be related to power loss, since shorter wavelength in the visible light spectrum has higher losses in optical fibers and lower power levels decrease the performance. This is evident from FIG. 10C showing increased error count for lower illumination intensity.

Thus the present technique provide a neuron unit configuration, multimode optical fiber arrangement, and corresponding neural network enabling all optical processing of input data in accordance with selected training. The neuron unit includes a multi-mode optical fiber enabling collection and propagation of input signal having input wavefront to provide exit light, and spatial light modulator located in optical path of the exit light and configured to apply selected modulation pattern to the exit light to provide output light of the neuron unit. The use of such optical neuron unit in neural processing network may enable high-speed processing of visual data, e.g. for characterization and analysis of image data. This may be used for various applications from image and face recognition, analysis of biomedical imaging results etc. Further, the use of multimode optical fiber with filtering unit, e.g. Sobel filtering, enables pre-processing of image data for reconstructions using any neural network configuration (being optical as described herein or not). The present technique provides enhanced image processing using non-coherent and/or polychromatic illumination and simplifying processing power for cases where computer based neural network is used.

The invention claimed is:

1. An artificial neuron unit for processing of input light, the artificial neuron unit comprising:
    a modal mixing unit configured for receiving input light and applying selected mixing to light components of two or more modes within the input light providing exit light, said modal mixing unit being configured as a multimode optical fiber (MMF) having a first end and a second end, and being configured for receiving the input light at the first end, enabling propagation of the input light through the MMF while mixing spatial modes of the input light propagating in respective velocities within the MMF to yield an exit light, and for outputting the exit light at the second end;
    an input optical arrangement, configured for coupling the input light into the first end of the MMF;
    a filtering unit configured for applying preselected filter onto said exit light for selecting one or more modes of the exit light, thereby providing output light of the artificial neuron unit, said filtering unit being configured as a spatial light modulator (SLM), configured for imposing a selected spatially varying modulation on the exit light to yield an output light; and
    a control unit configured and operable for operating said SLM and for determining spatial light modulation applied thereby, said control unit being configured for selecting spatial modulation to output light in accordance with training process of a neural processing network comprising said unit.

2. The artificial neuron unit of claim 1, wherein said model mixing unit is configured for mixing two or more modes selected by at least one of the following: polarization orientation modes, wavelength ranges, spatial modes within a selected region, or spatial modes within two or more cores of the model mixing unit.

3. The artificial neuron unit of claim 1, wherein said modal mixing unit is configured for applying linear mixing thereby providing said exit light being weighted linear combination of two or more modes of the input light.

4. The artificial neuron unit of claim 1, further comprising an output optical arrangement configured for interacting with the output light.

5. The artificial neuron unit of claim 1, further comprising a feedback route configured for receiving at least a portion of the exit light at said second end of the MMF and directing light components of said at least a portion of exit light toward said first end of the MMF for mixing said light components with at least a portion of input light, said feedback route being associated with an output port being associated with said spatial light modulator.

6. The artificial neuron unit of claim 5, wherein said output port of the feedback route being an auxiliary output port configured for outputting light signals associated with said mixing of said light components collected via the feedback route with at least a portion of input light.

7. The artificial neuron unit of claim 5, wherein said output port of the feedback route is configured for providing output associated with at least a portion of the output light.

8. The artificial neuron unit of claim 5, wherein said feedback route comprises gain unit and is configured for transmitting least a portion of the exit light through said gain unit for increasing intensity thereof.

9. The artificial neuron unit of claim 1, wherein said artificial neuron unit is located at input port of a neural network structure and configured for applying selected pre-processing to light signals provided to a neural network processing structure.

10. An artificial neuron network, comprising:
    one or more artificial neuron units for processing of input light, the artificial neuron unit comprising a modal mixing unit configured for receiving input light and applying selected mixing to light components of two or more modes within the input light providing exit light, and a filtering unit configured for applying preselected filter onto said exit light for selecting one or more modes of the exit light thereby providing output light of the artificial neuron unit;
    wherein said one or more artificial neuron units are arranged in one or more neuron layers along a path of propagation of an optical signal, such that the optical signal is configured to propagate through the one or more artificial neuron units between input ports of artificial neuron units of an input layer to output ports of artificial neuron units of a output layer providing output signal of said network.

11. The artificial neuron network of claim 10, further comprising one or more feedback route configured for receiving at least one portion of output light from at least one output port of an artificial neuron unit of said output layer and directing at least a portion of the output light for mixing with at least a portion of input light directed at artificial neuron units of the input layer, and for outputting at least a portion of the mixed light.

12. The artificial neuron network of claim 11 wherein the feedback route comprises:
a feedback unit, configured for receiving the output light; and
an X-coupler having a first and a second input end and a first and a second output end, and configured for receiving the at least one portion of output light from the feedback unit via the first input end, receiving the input light in via the second input end, mixing the input light and the output light to yield the mixed light, directing the at least first portion of the mixed light into the MMF's first end, and outputting the at least a second portion of the mixed light.

13. The artificial neuron network of claim 12, wherein said artificial neuron network further comprises an all-optical light modulator located at second output end of the X-coupler, said all-optical light modulator being configured as a liquid crystal valve.

14. The artificial neuron network of claim 12, wherein said artificial neuron network further comprises a nonlinear light modulator located at second output end of the X-coupler and configured for applying one or more nonlinear interactions to light components passing therethrough, said one or more nonlinear interactions comprises at least one of second harmonic generation, sum frequency generation, difference frequency generation.

15. The artificial neuron network of claim 12, wherein the feedback route comprises:
a first semi-transparent mirror located near or at the second end of the MMF; and
a second semi-transparent mirror located near or at the first end of the MMF;
wherein:
the first mirror is confirmed for reflecting the at least one portion of the output light back into the second MMF, such that the at least one portion of the output light enters the MMF via the second end and exit the MMF via the first end;
the second mirror is configured for reflecting the at least one portion of the output light back into the MMF via the first end, while transmitting at least one portion of the input light into the MMF via the first end, such that the at least one portion of the input light and the at least one portion mix in the MMF yielding mixed light;
the first mirror is configured for transmitting at least a portion of the mixed light, such that the artificial neuron network is configured for outputting the at least one portion of the mixed light.

16. The artificial neuron network of claim 12, wherein the feedback route comprises one or more optical fibers configured for directing said at least a portion of the output light for mixing with said input light.

17. The artificial neuron network of claim 16, wherein said one or more optical fibers comprising one or more of: single-core fiber, multi-core fiber, and a bundle of optical fibers.

18. An artificial neuron unit for processing of input light, the artificial neuron unit comprising:
a modal mixing unit configured for receiving input light and applying selected mixing to light components of two or more modes within the input light providing exit light, said modal mixing unit being configured as a multimode optical fiber (MMF) having a first end and a second end, and being configured for receiving the input light at the first end, enabling propagation of the input light through the MMF while mixing spatial modes of the input light propagating in respective velocities within the MMF to yield an exit light, and for outputting the exit light at the second end,
an input optical arrangement, configured for coupling the input light into the first end of the MMF;
a filtering unit configured for applying preselected filter onto said exit light for selecting one or more modes of the exit light thereby providing output light of the artificial neuron unit, said filtering unit being configured as a spatial light modulator (SLM), configured for imposing a selected spatially varying modulation on the exit light to yield an output light; and
a feedback route configured for receiving at least a portion of the exit light at said second end of the MMF and directing light components of said at least a portion of exit light toward said first end of the MMF for mixing said light components with at least a portion of input light, said feedback route being associated with an output port being associated with said spatial light modulator.

19. The artificial neuron unit of claim 18, further comprising a control unit configured and operable for operating said spatial light modulator (SLM) and for determining spatial light modulation applied thereby.

20. The artificial neuron unit of claim 19, wherein said control unit is configured for selecting spatial modulation to output light in accordance with training process of a neural processing network comprising said unit.

21. The artificial neuron unit of claim 18, wherein said model mixing unit is configured for mixing two or more modes being selected by at least one of the following: polarization orientation modes, wavelength ranges, spatial modes within a selected region and spatial modes within two or more cores of the model mixing unit.

22. The artificial neuron unit of claim 18, wherein said modal mixing unit is configured for applying linear mixing thereby providing said exit light being weighted linear combination of two or more modes of the input light.

23. The artificial neuron unit of claim 18, further comprising an output optical arrangement configured for interacting with the output light.

24. The artificial neuron unit of claim 18, wherein said output port of the feedback route is an auxiliary output port configured for outputting light signals associated with said mixing of said light components collected via the feedback route with at least a portion of input light.

25. The artificial neuron unit of claim 18, wherein said output port of the feedback route is configured for providing output associated with at least a portion of the output light.

26. The artificial neuron unit of claim 18, wherein said feedback route comprises gain unit and is configured for transmitting least a portion of the exit light through said gain unit for increasing intensity thereof.

27. The artificial neuron unit of claim 18, configured for locating at input port of a neural network structure and configured for applying selected pre-processing to light signals provided to a neural network processing structure.

* * * * *